United States Patent [19]

Mitchell et al.

[11] Patent Number: 5,726,233
[45] Date of Patent: Mar. 10, 1998

[54] METHOD FOR MANUFACTURING A COATING ADDITIVE, AN ADDITIVE, AND A PAINT FORMULATION

[75] Inventors: George M. Mitchell; John M. Spangler, both of Peoria, Ill.

[73] Assignee: Caterpillar Inc., Peoria, Ill.

[21] Appl. No.: 521,692

[22] Filed: Aug. 31, 1995

[51] Int. Cl.$^6$ ................................................. C08K 3/26
[52] U.S. Cl. ........................... 524/425; 525/426; 525/427; 523/200; 523/202; 523/205; 523/210; 106/412; 106/463; 106/464; 106/465; 106/500
[58] Field of Search ........................ 524/425, 426, 524/427; 523/200, 202, 205, 210; 106/412, 463, 464, 465, 500

[56] References Cited

U.S. PATENT DOCUMENTS 5,092,928  3/1992  Spangler ........................ 106/287.34

*Primary Examiner*—Edward J. Cain
*Attorney, Agent, or Firm*—Pankaj M. Khosla

[57] ABSTRACT

A process is disclosed for making a resin additive for a liquid paint. The process comprises of the steps selecting a thermosettable organic resin, curing the resin to form a cured thermoset resin, and particulizing the cured resin to a size no greater than about 20 μm. The present invention is particularly useful in making environmentally friendly paint formulations.

25 Claims, No Drawings ns. 5,726,233

METHOD FOR MANUFACTURING A COATING ADDITIVE, AN ADDITIVE, AND A PAINT FORMULATION

TECHNICAL FIELD

The present invention relates to a method for manufacturing an additive for a coating and more particularly, to a method for manufacturing a resin encapsulated additive for a liquid paint formulation.

BACKGROUND ART

The coating industry is constantly searching for cost-effective solutions to improve coating performance, whether it is to improve the corrosion resistance of a paint, or to improve the dispersion of color pigment in the paint formulation. A typical paint formulation has an organic solvent to uniformly disperse the base resin and pigment. During spray painting, the solvent is emitted into the environment. The coating industry is trying to respond to the need for environmentally friendly paints that use less solvents.

It is desirable to have an additive for a liquid paint that improves the corrosion resistance of the paint. It is also desirable to have an additive for a liquid paint that improves the dispersion of the paint pigment in the paint formulation, thus saving time, labor and resources. It is likewise desirable to have a process for making such an additive for a paint. Finally, it is desirable to have a paint formulation that is environmentally friendly and has additives in it that result in a reduced usage of paint pigments and solvents to not only save resources, but also result in a significant reduction in volatile organic compound (VOC) emissions and help further the congressional mandate requiring a reduction in volatile emissions.

The present invention is directed to overcome one or more of the problems as set forth above.

DISCLOSURE OF THE INVENTION

In one aspect of the invention, a process is disclosed for making a resin additive for a liquid paint. The process comprises of the steps selecting a thermosettable organic resin, curing the resin to form a cured thermoset resin, and particulizing the cured resin to a size no greater than about 20 μm.

In another aspect of the present invention, a resin additive for a liquid paint is disclosed. The resin additive comprises a cured thermoset organic resin. The cured thermoset organic resin has a particle size no greater than about 20 μm.

In yet another aspect of the present invention, a paint formulation having a resin additive is disclosed. The paint formulation comprises a liquid paint, and a cured thermoset organic resin dispersed in the liquid paint. The cured thermoset organic resin has a particle size no greater than about 20 μm.

The present invention is particularly useful in making environmentally friendly paint formulations.

BEST MODE FOR CARRYING OUT THE INVENTION

In the process of this invention, the thermosettable organic resin is desirably selected from one of alkyd resin, acrylic resin, polyester resin and polyurethane, and mixtures thereof. It is important that the resin selected be a thermosettable resin, as opposed to a thermoplasticisable resin. When cured, the thermosettable resin becomes a cured thermoset resin and is thus capable of bonding to the "base resin" of the coating into which the resin additive is incorporated to, without flowing like a thermoplastic when heated. It has been discovered that this characteristic of a thermoset resin can be exploited to impart greater corrosion resistance and toughness to a coating and enhance coating performance. All of the above resins are suitable for paint applications and are very compatible, from the point of view of being dispersible in paint formulations and solvents most commonly used in the paint industry. Such solvents are well known to those skilled in the art. Preferably, the thermosettable organic resin is a polyester resin. This resin is preferred over the others because it is most suitable for paint applications. Even more preferably, the organic resin selected is an alkyd resin. Alkyd resin may be of short, medium or long chains. The preferred alkyd resin is a short chain alkyd resin because it provides a very durable, hard, high quality coating. This resin is particularly well suited for primers and top coats, applications which are well known to those skilled in the art.

In the process of this invention, the resin is cured to form a thermoset cured resin. The curing may be done by various means depending upon the resin selected, including microwave curing. When the resin selected is a polyester resin, curing is accomplished by catalytically polymerizing the resin with isocyanate. Other resins such as alkyds and acrylics can also be chemically polymerized. Such polymerization reactions are well known to those skilled in the art and need not be discussed here. When the resin selected is an alkyd resin, curing is accomplished by drying the resin in air, i.e., in the presence of oxygen and nitrogen at a temperature of about 200° F. Curing by air drying is well known to those skilled in the art. When the resin selected is an acrylic resin, it is cured by baking in an oven at a temperature desirably in the range of 550° F. to 600° F., and preferably at about 600° F. It must be noted that even alkyd resins and polyesters can be cured by baking. When a polyester resin is cured by baking, it may be first chemically catalyzed by reacting with melamine. Such curing methods are well known to those skilled in the art.

In the process of this invention, the cured resin is particulized to a particle size desirably no greater than about 20 μm and preferably, no greater than about 15 μm. Particulizing the cured thermoset resin is a very important step in the process of this invention. A resin particle size greater than about 20 μm is undesirable because it does not disperse into a liquid paint very well and when the paint is deposited onto a surface, the resultant paint coating has a poor finish and shine. This occurs because the resin additive particles do not advantageously "pack" well, but detrimentally tend to disperse randomly in the coating. Further, a resin particle size no greater than about 15 μm is preferable when the resin additive is added to a paint formulation that is used as a "top coat". When the resin additive is dispersed in a "premium top coat" quality paint formulation, it is preferred that the resin particle size be no greater than about 8 μm.

In the preferred embodiment of the process of this invention, resin encapsulable particles are dispersed into the thermosettable organic resin before the resin is cured. These particles preferably have a size no greater than about 20 μm. These encapsulable particles are desirably, color pigments. The color pigment particles are dispersed into the thermosettable resin and encapsulated by the resin when the resin is cured. Alternatively, these particles are calcium carbonate particles, similarly encapsulated by the resin. Calcium carbonate can be used as a cost effective filler in a colored paint formulation, thus reducing the chalking of the coating and also the amount of volatile organic solvents emitted into the environment. Desirably, the resin encapsulable particles are present in an amount no greater than about 50% by weight of the resin. An amount greater than 50% by weight results in too much loading of the thermoset resin and detrimentally results in poor encapsulation of the particles. Preferably, the resin encapsulable particles are present in an amount no greater than about 25% by weight of the resin, and even more preferably, in an amount no greater than about 10% by weight, especially in the formulation of "top coats".

In another embodiment of the present invention, a resin additive for a liquid paint comprises a cured thermoset resin having a particle size no greater than about 20 µm. In the best mode of this embodiment, preferably, the resin additive includes resin encapsulable particles dispersed in it wherein at least about 50% of the surface area of the particles is encapsulated by the thermoset resin.

In yet another embodiment of the present invention, a paint formulation comprises a liquid paint, and a cured thermoset organic resin dispersed in the liquid paint. Desirably, the cured thermoset organic resin has a particle size no greater than about 20 µm, preferably, no greater than about 15 µm, and even more preferably, no greater than about 8 µm. In the best mode of this embodiment, the paint formulation includes resin encapsulable particles, preferably color pigments, dispersed in the thermoset resin and encapsulated by the resin, and are desirably present in an amount no greater than about 50% by weight of the resin, and preferably, no greater than about 25%. Preferably, the pigments have a particle size no greater than about 8 µm. Preferably, the resin additive is present in the liquid paint in an amount no greater than about 50% by weight. An amount greater than 50% by weight results in too much loading of the base resin of the liquid paint and detrimentally results in poor coating quality. Preferably, the resin additive is present in an amount no greater than about 25% by weight of the liquid paint, and even more preferably, in an amount no greater than about 10% by weight, especially in the formulation of "top coats".

In the following Example A, a paint formulation having a resin additive for a liquid paint, representing an embodiment of the present invention, was made in the following manner:

EXAMPLE A

A thermosettable short chain alkyd resin was cured by air drying at 200° F. The alkyd resin used had the trade name "13C-119A" and was manufactured by Moline Paint Manufacturing. The resultant cured thermoset alkyd resin was pulverized in a hammer mill to a particle size in the range of about 80 µm to 100 µm and then further particulized in a jet mill to an average particle size of about 8 µm to result in a resin additive embodying the present invention. The resin additive was dispersed in a liquid paint having an acrylic base resin. Sample 1 represents the liquid paint without the resin additive. Samples 2 and 3 represent paint formulations with the resin additive present in an amount of 5% and 10% by weight in the liquid paint. The dispersion quality of the resin additive in the paint for samples 2 and 3 was measured. Then the paint formulations of samples 1–3 were applied to a metal surface and their corrosion resistance was determined.

The dispersion quality of the resin additive in the liquid paint was determined according to ASTM Test Method D 1210-79 titled "Standard Test Method for Fineness of Dispersion of Pigment-Vehicle Systems".

The corrosion resistance of the paint formulations was determined according to ASTM Test Method D 1654-79a titled "Evaluation of Painted or Coated. Specimens Subjected to Corrosive Environments".

Both samples 2 and 3, which had the resin additive particulated to a size of about 8 µm had a Hegman Scale value of about 7 or greater, as observed from the Typical Fineness Gage Patterns.

Table 1 represents the results of the corrosion tests:

TABLE 1

| Sample | Wt. % Resin Additive | Creep |
|---|---|---|
| 1 | 0 | 0.188 inch |
| 2 | 5 | 0 to 0.250 inch |
| 3 | 10 | 0.031 to 0.125 inch |

It can be observed that by adding the resin additive of the present invention in the paint, its corrosion resistance was enhanced.

INDUSTRIAL APPLICABILITY

A very significant savings of time, labor, and resources is that through the process of this invention, it is possible to manufacture an additive for a coating that makes the coating "environmentally friendly". The use of the resin additive of the present invention results in a reduced usage of paint pigments and organic solvents, thus not only saving resources, but also resulting in a significant reduction in volatile organic compound (VOC) emission into the environment.

The process of the present invention is particularly useful in making additives for coatings used for various applications, and especially paint formulations.

Other aspects, objects and advantages of this invention can be obtained from a study of the disclosure and the appended claims.

We claim:

1. A process for making a resin additive for a liquid paint, comprising the steps of:
   selecting a thermosettable organic resin,
   curing said resin and forming a cured thermoset resin, and
   particulizing said cured resin to a size no greater than about 20 µm.

2. A process, as set forth in claim 1, including the step of dispersing resin encapsulable particles in said thermosettable organic resin.

3. A process, as set forth in claim 2, including the step of encapsulating said particles with said thermosettable organic resin.

4. A process, as set forth in claim 1, wherein said thermosettable organic resin is one of alkyd resin, acrylic resin, polyester resin and polyurethane, and mixtures thereof.

5. A process, as set forth in claim 1, wherein said thermosettable organic resin is an alkyd resin.

6. A process, as set forth in claim 5, wherein the step of curing includes curing by drying said resin in the presence of oxygen and nitrogen.

7. A process, as set forth in claim 1, wherein said thermosettable organic resin is a polyester resin.

8. A process, as set forth in claim 7, wherein the step of curing includes curing by catalytically polymerizing said resin by isocyanate.

9. A process, as set forth in claim 2, wherein said resin encapsulable particles are present in said thermosettable resin in an amount no greater than about 50% by weight of said resin.

10. A process, as set forth in claim 9, wherein said particles are color pigments.

11. A process, as set forth in claim 9, wherein said particles are calcium carbonate particles.

12. A process, as set forth in claim 1, wherein said size is no greater than about 15 μm.

13. A resin additive for a liquid paint, comprising:

a cured thermoset organic resin, and said cured thermoset organic resin having a particle size no greater than about 20 μm.

14. A resin additive for a liquid paint, as set forth in claim 13, including resin encapsulable particles dispersed in said thermoset resin, said resin encapsulable particles being encapsulated by said thermoset resin.

15. A resin additive for a liquid paint, as set forth in claim 14, wherein at least 50% of the surface area of said resin encapsulable particles is encapsulated by said resin.

16. A resin additive for a liquid paint, as set forth in claim 14, wherein said resin encapsulable particles are present in said thermoset resin in an amount no greater than about 50% by weight of said resin.

17. A resin additive for a liquid paint, as set forth in claim 14, wherein said thermosettable organic resin is one of alkyd resin, acrylic resin, polyester resin and polyurethane, and mixtures thereof.

18. A resin additive for a liquid paint, as set forth in claim 14, wherein said resin encapsulable particles are color pigments.

19. A resin additive for a liquid paint, as set forth in claim 14, wherein said resin additive has a particle size no greater than about 15 μm.

20. A paint formulation having a resin additive, comprising:

a liquid paint, a cured thermoset organic resin dispersed in said liquid paint, and said cured thermoset organic resin having a particle size no greater than about 20 μm.

21. A paint formulation having a resin additive, as set forth in claim 20, including resin encapsulable particles dispersed in said thermoset resin, said resin encapsulable particles being encapsulated by said resin.

22. A paint formulation having a resin additive, as set forth in claim 20, wherein said resin additive is present in said paint in an amount no greater than about 50% by weight of said paint.

23. A paint formulation having a resin additive, as set forth in claim 20, wherein said resin encapsulable particles are present in said thermoset resin in an amount no greater than about 50% by weight of said resin.

24. A paint formulation having a resin additive, as set forth in claim 20, wherein said resin encapsulable particles are color pigments.

25. A paint formulation having a resin additive, as set forth in claim 20, wherein said particle size is no greater than about 15 μm.

* * * * *